(12) United States Patent
Barthelemy

(10) Patent No.: US 7,161,265 B2
(45) Date of Patent: Jan. 9, 2007

(54) SOURCE AND SYSTEM WHICH ARE USED TO POWER A REMOVABLE ELECTRIC CHARGE

(76) Inventor: Fabrice Barthelemy, 10, rue Pierre Picard, F-91300 Massy (FR)

( * ) Notice: Subject to any disclaimer, the term of this patent is extended or adjusted under 35 U.S.C. 154(b) by 52 days.

(21) Appl. No.: 10/498,622

(22) PCT Filed: Dec. 10, 2002

(86) PCT No.: PCT/FR02/04241

§ 371 (c)(1),
(2), (4) Date: Jun. 10, 2004

(87) PCT Pub. No.: WO03/050638

PCT Pub. Date: Jun. 19, 2003

(65) Prior Publication Data

US 2005/0035666 A1    Feb. 17, 2005

(30) Foreign Application Priority Data

Dec. 11, 2001   (FR) ................................ 01 15999

(51) Int. Cl.
*H01H 35/00* (2006.01)
*H01H 83/00* (2006.01)
*H02B 1/24* (2006.01)

(52) U.S. Cl. .................................................... 307/116

(58) Field of Classification Search ................. 307/116
See application file for complete search history.

(56) References Cited

U.S. PATENT DOCUMENTS

| | | | |
|---|---|---|---|
| 5,229,712 A | | 7/1993 | Thornton |
| 5,297,015 A | * | 3/1994 | Miyazaki et al. ............ 363/146 |
| 5,324,990 A | | 6/1994 | Cunningham |
| 6,509,659 B1 | * | 1/2003 | Carroll et al. .............. 307/125 |
| 6,965,293 B1 | * | 11/2005 | Choi et al. ................. 338/22 R |

* cited by examiner

*Primary Examiner*—Stephen W. Jackson
*Assistant Examiner*—Carlos Amaya
(74) *Attorney, Agent, or Firm*—Greer, Burns & Crain, Ltd.

(57) ABSTRACT

The invention related to an electric power source which is intended to be connected to an electric charge by means of a removable connected cable. The inventive source comprises: a controllable electrical power conversion circuit which is used to convert an electrical output signal, at least one characteristic of said electrical output signal being controllable; a control circuit for the controllable power conversation circuit which is sued to control said at least one characteristic of the electric output signal according to a selection code that is representative of the requirements of the connected charge; and a cable presence detection circuit which can deliver a signal indicating the absence of the connecting cable in order to obtain, at the output of the power conversion circuit, a common pre-determined quiescent value for said at least one characteristic of the output signal.

17 Claims, 4 Drawing Sheets

SOURCE AND SYSTEM WHICH ARE USED TO POWER A REMOVABLE ELECTRIC CHARGE

The invention concerns an electric power supply source which is intended to be connected to an electric charge by means of a removable connecting cable.

More precisely, the invention concerns an electric power supply source which is intended to be connected to an electric charge by means of a removable connecting cable, including:
- a controllable electric power conversion circuit which is used to convert an electric input signal into an electric output signal, at least one characteristic of said electric output signal being controllable;
- a control circuit for the controllable power conversion circuit which is used to control said at least one characteristic of the electric output signal according to a selection code that is representative of the requirements of the connected charge.

The power supply sources known are used for supplying (AC) electric appliances and in particular household electric appliances. Electric appliances include typically a connecting cable and an electric charge, the connecting cable being intended for connecting the electric charge to the power supply source. These power supply sources are, for example, housed inside a wall outlet and are connected at input to a main voltage source such as a 230 VAC mains voltage source. At output, they deliver a converted voltage intended for powering the electric appliance. Thus, with these power supply sources, it is not necessary any longer to use an external voltage converter, i.e. situated outside the wall outlet.

The characteristics of the converted output voltage, such as its amplitude, are adjustable in order to enable the connection of various electric appliances requiring different supply voltages. To this end, the voltage source is capable of receiving a selection code of the output voltage to be delivered. This selection code is recorded in information storage means contained in the removable connecting cable of the electric appliance. Thus, when an appliance is disconnected and a new appliance is connected to the power supply source, the power supply source reads the selection code from the connecting cable used and adapts automatically the output voltage to that required by the new electric appliance.

However, with the power supply sources known, when an older appliance receiving a first voltage is replaced with a new appliance requiring a second voltage, smaller than the first, the new appliance is exposed for a short period of time to a surge voltage. Indeed, when the older appliance is disconnected, the output voltage of the power supply source remains unchanged. Consequently, when the new appliance is connected instead of the older one, it receives a voltage greater than the second voltage required, during the time necessary to read the new selection code and establish the corresponding second voltage. This temporary surge voltage may damage the new appliance.

The purpose of the invention is to remedy that shortcoming by providing a power supply source enabling to avoid unacceptable power supply conditions for removable electric appliances connected to a controllable power supply source.

It is thereof an object of this invention to provide an electric power supply source as defined above, characterised in that it includes a cable presence detection circuit, capable of delivering a signal of absence of the connecting cable to the control circuit, and in that the control circuit is capable, in response to the signal of absence of the connecting cable, of controlling the power conversion circuit in order to obtain, at the output thereof, a same pre-determined quiescent value for said at least one characteristic of the output electric signal.

The electric power supply source described above enables to avoid power supply conditions which are unacceptable for the electric charge. Indeed, the pre-determined quiescent value is selected to correspond to one value of the characteristic of the output electric signal which is acceptable for all the electric charges liable to be connected to the power supply source. Thus, thanks to the cable presence detection circuit wherewith it is equipped, the power supply source delivers at output an electric signal whereof the characteristics are equal to the quiescent value as soon as the connecting cable of the electric charge is disconnected. Consequently, when a new charge is connected, the electric signal delivered at output has a value which is acceptable for the new electric charge, even before the characteristics of the output electric signal could be adapted to the requirements of the new electric charge. There is therefore no risk any longer of damaging an electric charge at the time of connection.

According to other characteristics of an electric power supply source of the invention:
- the cable presence detection circuit is capable of delivering a signal of presence of the connecting cable to the control circuit, said presence signal of the connecting cable being related to the selection code representative of the requirements of the electric charge connected, and the control circuit is capable, in response to the signal of presence of the connecting cable, of controlling the power conversion circuit in order to obtain, at the output thereof, one value of said at least one characteristic of the output electric signal corresponding to the requirements of the electric charge connected;
- it includes:
  - at least a first terminal for connection to the connecting cable to transmit to the electric charge the output electric signal delivered by the electric power conversion circuit,
  - at least a second terminal for connection to the connecting cable intended for co-operating with a corresponding terminal of the connecting cable in order to indicate the absence or the presence of the connecting cable, said at least second connecting terminal being connected to the detection circuit;
- it comprises at least a third terminal for connection to the connecting cable to receive from the latter the selection code, said at least third terminal being connected to the detection circuit,
- the cable presence detection circuit includes an electric switch that may be toggled between a quiescent state and an active state wherein it indicates the presence of the connecting cable, this toggling taking place under the control of the connecting cable,
- the electric switch is a mechanical electricity switch which may be toggled between a quiescent position and an active position wherein it indicates the presence of the connecting cable, this displacement taking place under the action of the mechanical forces exerted to couple said at least second terminal to the corresponding terminal of the connecting cable,
- the controllable power conversion circuit is capable of delivering an output electric signal whereof said at least one controllable characteristic is controllable within a value range comprised a minimum value and a maximum value, and the quiescent value is equal to the minimum value, one characteristic of the controllable output electric signal is the amplitude of the voltage delivered by the power supply source, and one characteristic of the controllable output electric signal is the intensity of the current delivered by the power supply source.

It is another object of the invention to provide an electric power supply system for an electric charge, characterised in that it includes:

an electric power supply source according to the invention, and a removable cable connecting the electric charge to the power supply source, said cable being adapted for co-operating with the cable presence detection circuit of the power supply source.

According to other characteristics of an electric power supply source of the invention:

the connecting cable includes a removable device for adapting the cable to the power supply source, the control circuit of the power supply source is capable of regulating said at least one characteristic of the output electric signal, and a regulation loop of said at least one characteristic of the output signal is connected to the output of the controllable electric conversion circuit of the power supply source and to an input of the control circuit, a portion of the regulation loop being housed in the connecting cable when the latter is connected to the power supply source, the control circuit of the power supply source is capable of regulating said at least one characteristic of the output electric signal, and a regulation loop of said at least one characteristic of the output signal is connected to the output of the controllable electric conversion circuit of the power supply source and to an input of the control circuit, the regulation loop being housed solely inside the power supply source, the regulation loop comprises at least one resistor, the value of said at least one resistor forming a selection code, at least one resistor is housed in the removable connecting cable, and the power supply source comprises several resistors capable of being connected to the regulation loop under the control of the connecting cable, the value of each of said resistors forming, individually or in combination with the other resistors, a selection code.

The invention will be understood better when reading the following description, given solely for exemplification purposes and with reference to the appended drawings whereon.

Figure 1:
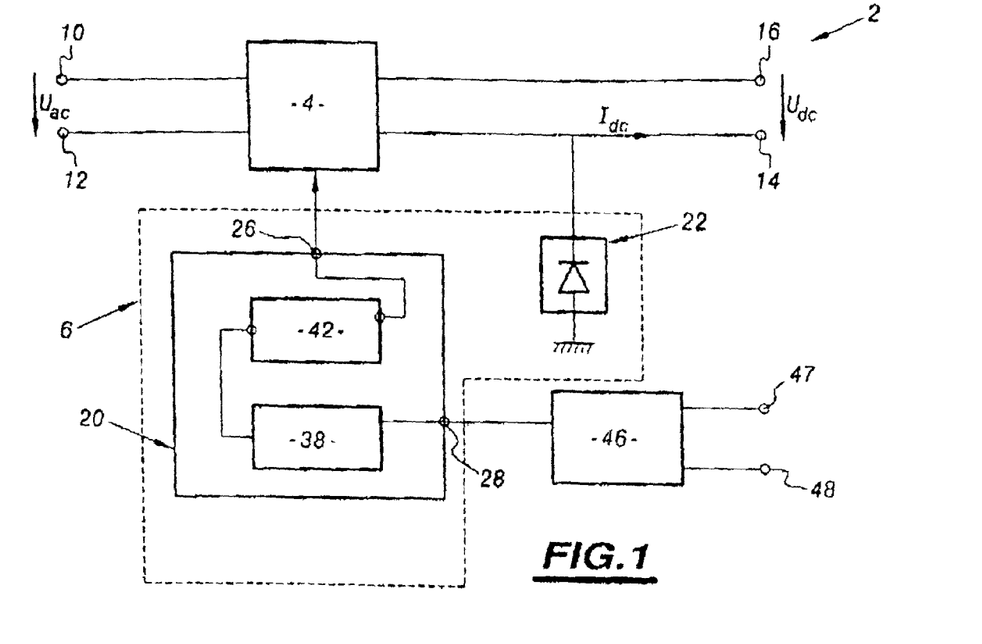
FIG. 1 is a schematic illustration of an electronic architecture of a power supply source according to the invention.

FIG. 1 represents a power supply source 2 capable of being housed inside a wall outlet. The source 2 is fitted with a controllable voltage converter 4 and with a control circuit 6.

The voltage converter 4 is connected to an alternating current power supply source (not represented) by means of two input terminals 10 and 12. This alternate voltage source delivers at the input of the converter an alternate voltage Uac ranging between 80 and 250 VAC. The power output of the converter 4 is connected to two connecting terminals 14 and 16.

This voltage converter 4 is capable of converting the alternate voltage Uac into direct voltage noted Udc. It is adapted so that the direct voltage Udc is equal to a fixed value, this fixed value being adjustable under the control of the control circuit 6, between a minimum value Umin and a maximum value Umax. For exemplification purposes, the values Umin and Umax are respectively equal to 1 Vdc and 42 Vdc. Thus, a controllable characteristic of the voltage converter 4 is here the voltage value Udc delivered at output. The connecting terminal 16 is at the reference potential, whereas the connecting terminal 14 is at the potential Udc.

The converter 4 is for example made out of an indirect converter, also known more frequently as 'flyback' converter. As these converters are well known, their structure will not be described here more in detail. For more information, the reader may for example refer to the following document: 'Alimentation à découpage (Chopper power supply)', Michel Girard, Edi-Sciences, 1993.

The control circuit 6 includes a voltage regulator 20 and voltage limiting circuit 22.

The regulator 20 is capable of controlling the voltage converter 4 relative to a constant reference voltage noted Uref to obtain at the output of the converter 4 a stable voltage Udc, corresponding to the reference voltage Uref. To that effect, the regulator 20 includes a control output 26 connected to the voltage converter 4 and a regulation loop input 28. The input 28 is intended for receiving a signal proportional to the voltage Udc.

The regulator 20 also comprises a comparator 38 and a circuit 42 for generating the control signal. An input of the comparator 38 is connected to the input 28 of the regulator 20 and an output of the comparator 38 is connected to an input of the circuit 42. The comparator 38 is intended for establishing and transmitting, at its output, a voltage correction signal proportional to the voltage difference existing between the signal present on its input 28 and the reference voltage Uref.

An example of embodiment of the comparator 38 will be described in conjunction with FIG. 2.

The control signal generation circuit 42 comprises an output connected to the control signal output 26 and an input connected to the output of the comparator 38 to receive therefrom the voltage correction signal. This circuit 42 is capable of converting the correction signal received into a corresponding control signal of the converter 4, whereas the purpose of the control signal is to negate the deviations measured by the comparator 38 between the signal proportional to the voltage Udc and the reference voltage Uref. The circuit 42 is conventional and will not be described in detail here.

The voltage limiting circuit 22 is connected between the connecting terminal 14 and the ground of the power supply source 2. It is capable of preventing the voltage Udc from exceeding the 42 Vdc threshold. It is for example composed of Zener diodes.

Finally, the power supply source 2 also includes a cable presence detection circuit 46 of the connecting cable, This circuit 46 comprises a first input connected to the connecting terminal 47 for receiving a selection code and a second input connected to a connecting terminal 48 indicating the presence of the cable. The circuit 46 also comprises an output connected to the input 28 of the regulator 20. The circuit 46 is capable of delivering an absence signal of the connecting cable to the control circuit 6 so that the latter, in response, actuates the converter 4 to establish a quiescent voltage, noted $U_0$. It is also capable of delivering a presence signal of the connecting cable to the control circuit 6 so that the latter, in response, actuates the converter 4 to establish an output voltage Udc corresponding to the selection code received via the connecting terminal 47. An example of embodiment of a detection circuit 46 is described in conjunction with FIG. 2.

The connecting terminals 14, 16, 47 and 48 are, for instance, sockets of a wall outlet wherein the power supply source 2 is housed.

Figure 2:
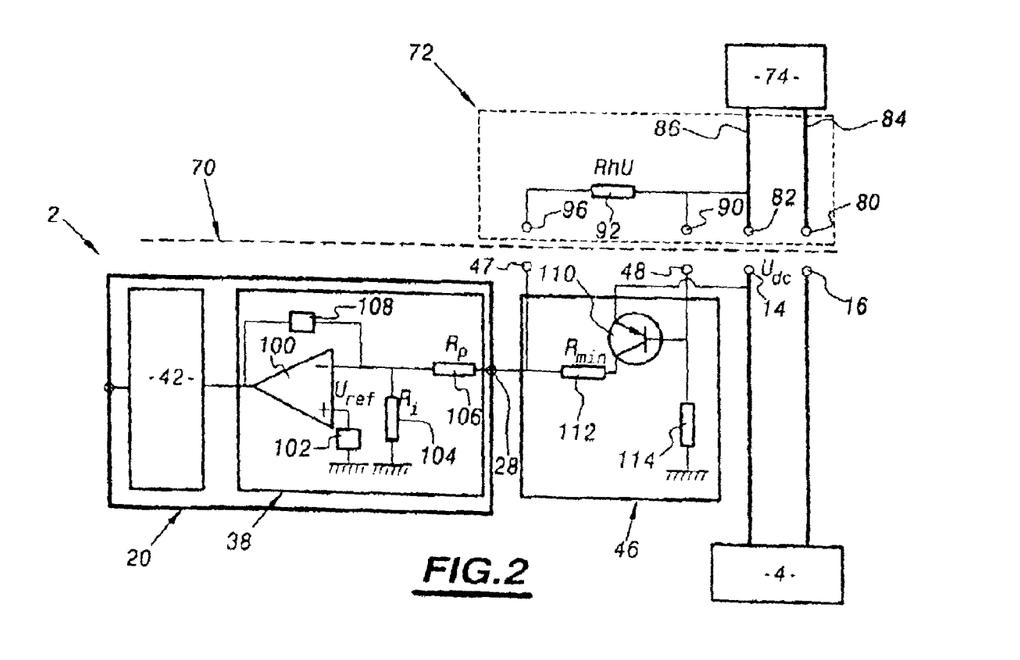
FIG. 2 is an electronic diagram of a first embodiment of a cable presence detection circuit wherewith is equipped a power supply source according to the invention.

On FIG. 2, the elements already described in conjunction with FIG. 1 have the same reference signs.

On that figure, a line 70 symbolises the interface between the power supply source 2 housed in the wall socket and a removable cable 72 for connection to an electric charge 74.

The connecting cable 72 comprises here two power connecting terminals 80, 82 intended respectively for connection to the terminals 16 and 14 of the power supply source 2. These terminals 80, 82 are connected respectively to an electric conductor 84 and to an electric conductor 86 housed in the cable 72. The electric conductors 84 and 86 are intended for carrying the power electric signal of the power supply source 2 up to the electric charge 74.

The connecting cable 72 also includes a connecting terminal 90 intended to indicate the presence of the connecting cable and a resistor 92 for selecting the output voltage.

The terminal 90 is connected inside the cable, 72, directly to the electric conductor 86. This terminal 90 is adapted for connection to the cable presence indication terminal 48 of the power supply source 2.

The resistor 92 defining a selection code is connected between the electric conductor 86 and a connecting terminal 96 of the cable 72, adapted for connection to the terminal 47 of the power supply source 2. The resistance 92 has a value, noted RhU, indicating the voltage required by the electric charge 74. The value RhU is determined to define an output voltage Udc greater than or equal to Umin and smaller than or equal to Umax.

The connecting terminals 80, 82, 90 and 96 are for instance the plugs of an outlet.

The comparator 38 includes a linear amplifier 100 whereof the output is connected to the circuit 42 of the regulator 20 in order to transmit thereto the voltage correction signal. The non-inverting input of the amplifier 100 is connected to a voltage reference 102 delivering the constant and stable voltage Uref. The inverting input of the amplifier 100 is connected to the earth via a resistor 104 whereof the value is noted Ri and to a first terminal of a resistor 106 whereof the value is noted Rp. The second terminal of the resistor 106 is connected to the input 28 of the regulation loop. A counter-reaction resistor 108 is connected between the inverting input and the output of the amplifier 100.

The detection circuit 46 includes a PNP transistor 110 whereof the collector is connected to the input 28 of the regulator 20 by means of a resistor 112 whereof the value is noted Rmin. The value Rmin defines the quiescent voltage, noted Uo, this voltage Uo being the voltage value Udc when the connecting cable is not connected 72 is not connected to the power supply source 2. The value Rmi is here selected so that Uo is equal to Umin. The transmitter of the transistor 110 is connected to the connecting terminal 14. The base of this transistor is connected on the one hand to the earth via a resistor 114 and on the other hand to the presence indication terminal 48 of the connecting cable. The input connected to the connecting terminal 47 is connected directly to the input 28 of the regulator 20.

The operation of the power supply source 2 will now be described using FIGS. 1 and 2.

When the connecting cable 72 is not connected to the power supply source 2, the regulation loop connected to the input 28 of the regulator 20 is established by means of the resistor 112. The transistor 110 of the detection circuit 46 lets the current through and the resistor 112 is therefore connected to the connecting terminal 14. Under those conditions, after a short transitory period when the connecting cable 72 has just been disconnected, the voltages at the inverting and non-inverting inputs of the amplifier 100 are equal. Indeed, any difference between both these inputs translated by a non-zero voltage correction signal which is transmitted to the circuit 42 generating the control signal. In response to this non-zero correction signal, the circuit 42 acts upon the converter 4 either to increase, or to decrease the output voltage Udc in order to negate the deviation between the voltage available at the inverting input and the voltage available on the non-inverting input of the amplifier 100. Thus, when the connecting cable 72 is not connected, the output voltage Udc is calculated using the following equation:

$$Udc = Uref \times \frac{Rp + Ri + Rmin}{Ri} = Uo = Umin$$

The value Rmin of the resistor 112 is here selected so that the quiescent voltage Uo is equal to the minimum voltage Umin which can be delivered at the output of the converter 4. The output voltage Udc is therefore equal to Umin when no connecting cable is connected to the power supply source 2.

When the connecting cable 72 is connected to the power supply source 2, the base of the transistor 110 is then connected via the terminals 48 and 90 to the output voltage Udc. The transmitter and the base of the transistor 110 being short-circuited, the latter does not let current through any longer.

The regulation loop of the regulator 20 is therefore not established via the resistor 112 any longer, but via the resistor 92 contained in the connecting cable 72. Indeed, this resistor 92 is connected to the input 28 of the regulator 20 via the connecting terminals 96 and 47.

Under these conditions, after a short transitory period, the voltages at the inverting and non-inverting inputs of the amplifier 100 are equal. The output voltage Udc is calculated according to the following formula:

$$Udc = Uref \times \frac{(Rp + Ri + RhU)}{Ri}$$

The value RhU of the resistor 92 being selected to define a voltage greater than or equal to the voltage Umin, the voltage Udc is therefore greater than or equal to the quiescent voltage Uo delivered by the power supply source 2 when no connecting cable is connected. Thus, during the transitory phase during which the voltage delivered by the power supply source 2 is not equal yet to that required by the electric charge 74, the voltage Udc varies gradually from its quiescent value Uo towards the value corresponding to RhU. The electric charge which has just been connected is therefore not exposed to any unacceptable voltage during this transitory phase.

Figure 3A:
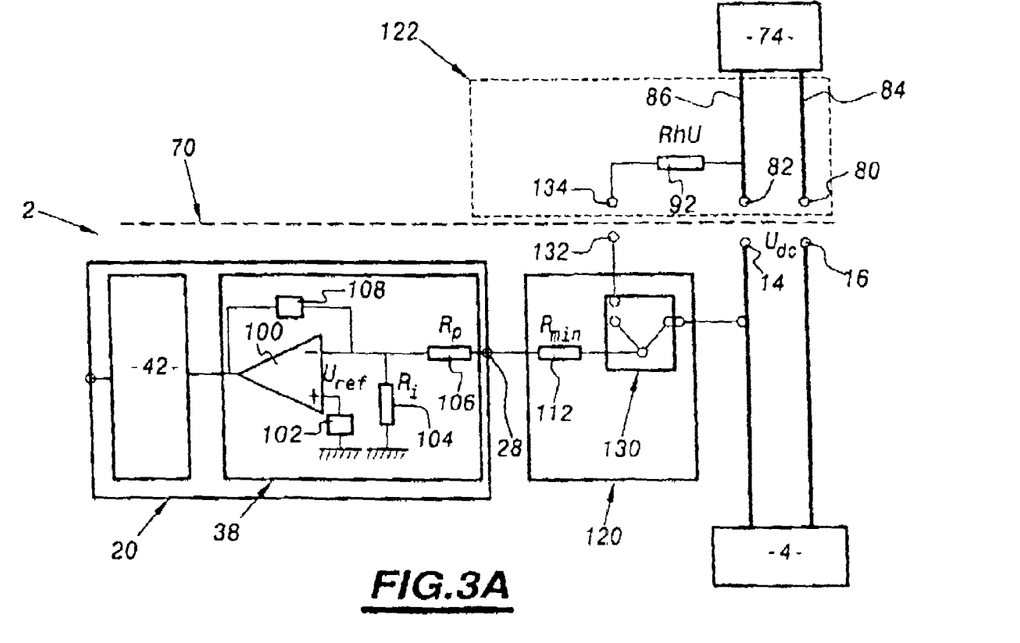
FIGS. 3A and 3B are electronic diagrams of two variations of the cable presence detection circuit of FIG. 2.

FIG. 3A represents another embodiment of a detection circuit 120 capable of co-operating with a connecting cable 122.

On this FIG. 3A, the elements already described in conjunction with previous FIGS. 1 and 2 show the same reference signs, The detection circuit 120 includes a mechanical electricity switch 130 connected via the resistor 112 to the input 28 of the regulator 20. This mechanical switch 130 is moveable between a quiescent position and an active position under the control of the cable 122. In the quiescent position corresponding to the case when the cable 122 is not connected to the power supply source 2, the switch 130 connects the connecting terminal 14 to the input 28 of the regulator 20 via the resistor 112 In its active position corresponding to the case when the cable 122 is connected to the power supply source 2, the switch 130 connects a connecting terminal 132 to the input 28 of the regulator 20 via the resistor 112. The terminal is for example a metal push-button capable simultaneously to ensure electric continuity with a corresponding connecting terminal of the cable 122 and of moving the switch 130 to and through between its active and inactive positions, The connecting cable 122 is similar to the connecting cable 72 with the exception that the connecting terminals 90 and 96 (FIG. 2) have been replaced with a single connecting terminal 134. The connecting terminal 134 is connected to the electric conductor 86 via the resistor 92. The terminal 134 is adapted for co-operating with the terminal 132 of the detection circuit 120 in order simultaneously to bring the switch 130 into active position and to establish the electric continuity between the terminal 134 and the terminal 132. Thus, in this variation, the terminal 132 combines into a single terminal the functions of the terminals 47 and 48 of FIG. 2.

The variation described in conjunction with FIG. 3A operates similarly to what has just been described, However, in this variation, the value of the output voltage Udc, when a connecting cable is connected, is calculated according to the following formula:

$$Udc = Uref \times \frac{(Rp + Ri + Rmin + RhU)}{Ri}$$

Figure 3B:
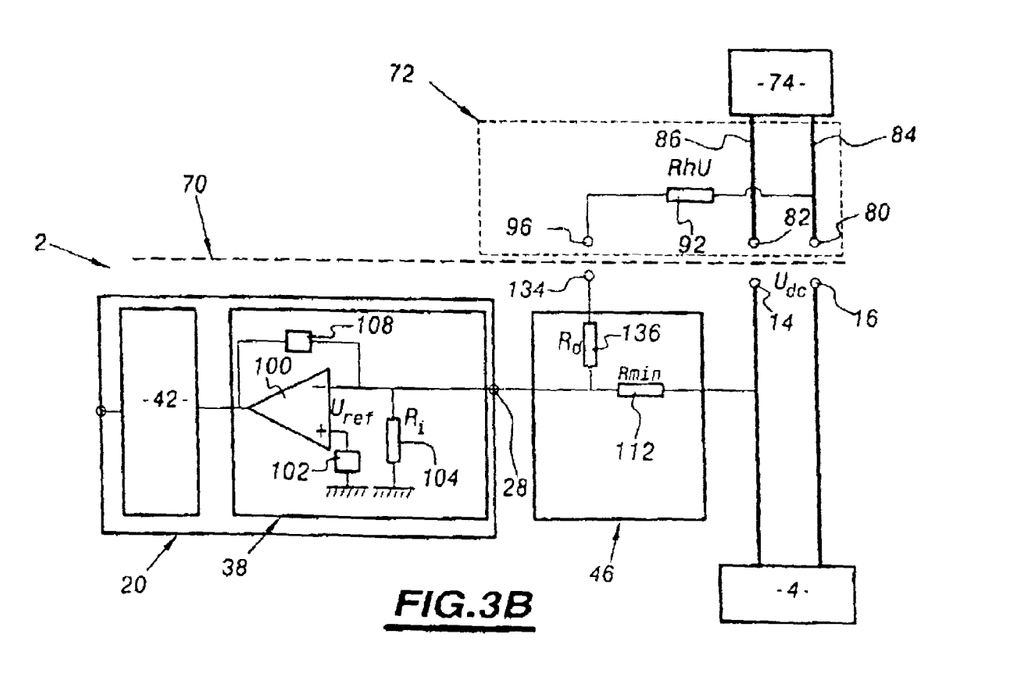

FIG. 3B represents a different embodiment of the detection circuit 46.

In this embodiment, the transistor 110 and the resistor 114 of the detection circuit 46 have been dispensed with. The connecting terminals 47 and 48 connected at the input of the detection circuit 46 have been replaced with a single connecting terminal 134. The resistor 112 is connected directly to the connecting terminal 134 and a resistor 136 is interposed between the connecting terminal 134 and the output of the detection circuit 46. Finally, the resistor 106 of the comparator 38 has been dispensed with and the inverting terminal of the amplifier 100 is connected directly to the input 28 of the regulator 20.

Similarly to what has been described in conjunction with FIG. 3A, the connecting cable 72 (FIG. 2) is adapted for co-operating with the connecting terminal 134. Thus, the connecting terminal 90 (FIG. 2) of the connecting cable 72 has been dispensed with and the resistor 92 of the connecting cable 72 is connected directly to the conductor 84 and not to the conductor 86 any longer.

The operation of this embodiment is derived from that described in conjunction with FIG. 2. However, the value of the output voltage Udc, when a connecting cable is connected, is calculated according to the following formula:

$$Udc = Ref.[Rmin(Ri + RhU + Rd) + Ri(RhU + Rd)]/Ri(RhU + Rd)$$

It will be noted that, in the embodiment of FIG. 3B, the detection circuit 46 does not include any electric switch and that the resistor 136 is a resistor intended for preventing surge voltages when the resistor 92 is short circuited, i.e when RhU is equal to zero.

Figure 4A:
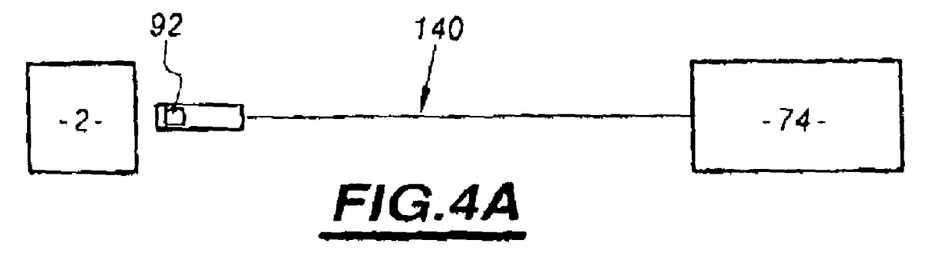
FIGS. 4A, 4B, 4C and 4D are respectively diagrammatical views of four embodiments of a connecting cable intended for connection to a power supply source according to the invention.

FIGS. 4A, 4B, 4C and 4D represent four possibilities for housing the voltage selection resistor 92 close to the electric appliance. FIG. 4A represents a first possibility wherein the voltage selection resistor is integral with and set permanently inside a removable cord 140 to form together the connecting cable, intended to be connected to the power supply source 2.

Figure 4B:
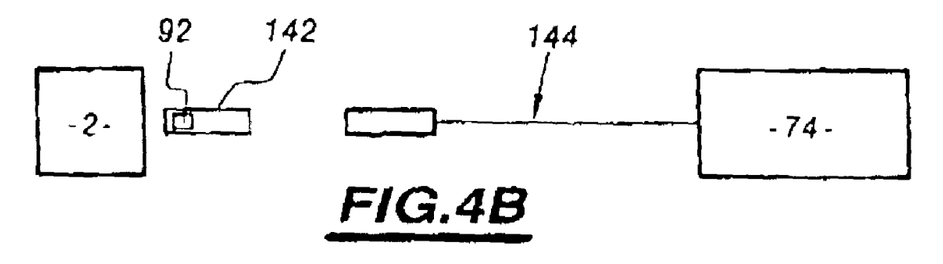

FIG. 4B represents a second possibility wherein the voltage selection resistor 92 is placed in a removable encoding device 142. This device 142 is adapted to be connected removably on one side to the power supply source 2 and on the other side for receiving a cord 144 enabling connection to the electric charge 74. The connecting cord 144 is for example a conventional cable. The cord 144 and the encoding device form the connecting cable.

Figure 4C:
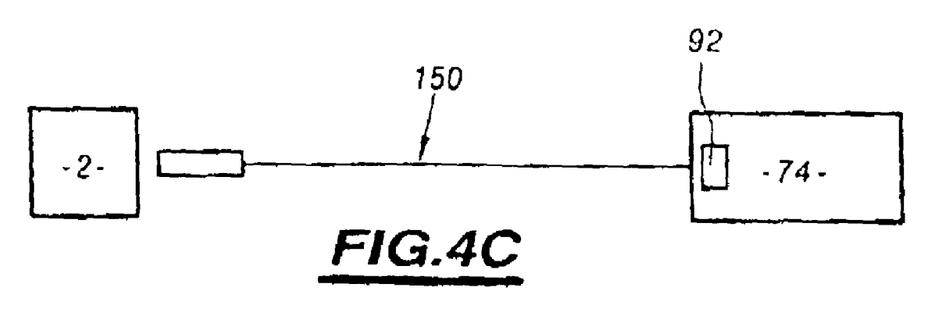

FIG. 4C represents a third possibility wherein the selection resistor 92 is contained in the electric charge 74, the electric charge 74 being connected to the power supply source 2 by a cord 150. This cord 150 includes for example two additional electric conductors intended to be connected between the resistor 92 contained in the electric charge 74 and the connecting terminals 47, 48 of the power supply source 2. The resistor 92 integrated in the electric charge 74 and the cord 150 form together a third embodiment of the connecting cable.

Figure 4D:
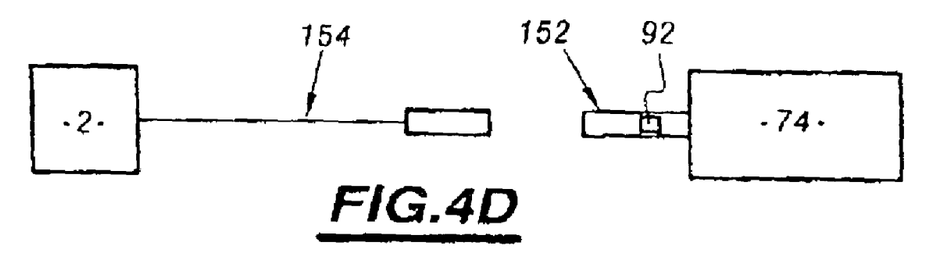

FIG. 4D represents a fourth embodiment of a connecting cable. In this embodiment, the connecting cable is reduced to a removable encoding device 152. This device 152 is adapted to be connected via one end to the electric charge 74 and via its other end to an electric extension cord 154. The device 152 is similar to the device 142 of FIG. 4B and Includes the selection resistor 92. The electric extension cord 154 is, for instance, attached in a non removable way by its end opposite the device 152, to the power supply source 2. The electric extension cord 154 enables to move the connecting terminals of the power supply source 2 away from its electric components.

Figure 5:
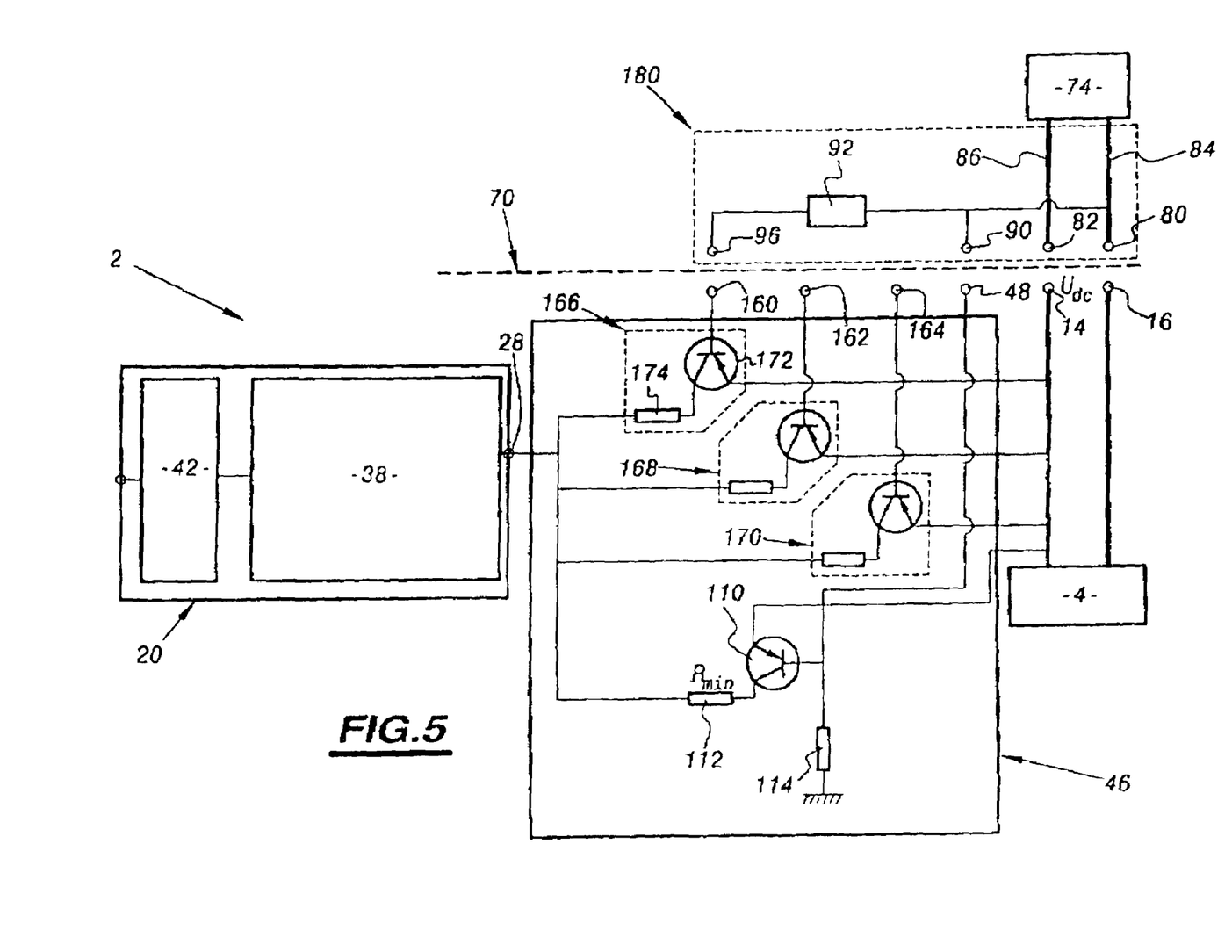
FIG. 5 is an electronic diagram of a variation of a power supply source according to the invention.

Finally, FIG. 5 represents a last embodiment wherein voltage selection resistors are housed inside the power supply source.

On that FIG. 5, the power supply source is similar to that described in conjunction with FIGS. 1 and 2. However, the connecting terminal 47 of FIG. 1 has been replaced with three distinct connecting terminals 160, 162 and 164, each connected to the input 28 of the regulator 20 via respective resistor switching circuits 166, 168 and 170 contained in the detection circuit 46.

The resistor switching circuit 166 includes a PNP transistor 172 whereof the collector is connected to the input 28 of the regulator 20 via a voltage selection resistor 174. The value of the resistor 174 has been selected to correspond to a first predetermined value of the output voltage of the converter 4. The transmitter and the base of this transistor 172 are respectively connected to the terminal 14 and to the terminal 160.

The resistor switching circuits 168 and 170 are similar to the circuit 166, except that their respective voltage selection resistors correspond to second and third different values of the output voltage Udc.

The connecting cable 180 is similar to the connecting cable 72, except that the value of the resistor 92 does not form a selection code of an output voltage Udc any longer. In this embodiment, it is the position of the connecting terminal 96 which indicates to the power supply source which voltage should be delivered for the electric charge 74. In the example represented, this connecting terminal 96 is adapted to be solely connected to the connecting terminal 160.

The operation of the embodiment of FIG. 5 is also derived from that of FIG. 2. Indeed, the operation of the circuit of FIG. 5 differs essentially from that of FIGS. 1 and 2 in the way the selection resistor is actuated.

Thus, when the connecting cable 180 is connected to the power supply source 2, only the transmitter-base junction of the transistor 172 is polarised and said transistor lets current through. The regulation loop is therefore established via the resistor 174, which then fixes the output voltage Udc to a value corresponding to the value of this resistor 174 In this embodiment, the voltage regulation loop Udc is therefore housed entirely in the power supply source 2.

Preferably, the quiescent value selected corresponds to the minimum voltage Umin which can be delivered by the power supply source 2. Indeed, under those conditions, when no connecting cable is connected to the power supply source 2, said source delivers automatically the voltage Umin. This operating mode corresponds therefore to a standby state of the power supply source wherein the energy consumption is minimal.

As a variation, the different resistors, used in detection circuits or in the comparator, may be replaced with Zener diodes.

In another variation, instead of varying the value of the resistor placed between the inverting terminal of the amplifier 100 and the terminal 14 of the power supply source 2, it is the value of the resistor 104 which is modified.

As a variation, the regulator is capable of controlling at the same time the output voltage Udc and the output intensity Idc of the converter 4. To do so, it includes a first input similar to the input 28 and a second regulation input of the current Idc. In this variation, the connecting cable or the device 142 includes a first resistor and a second resistor. The first resistor is voltage selection resistor similar to the resistor 92. The second resistance is a current intensity selection resistor and may be connected to the second regulation input. The value of the second resistor corresponds to the intensity of the current required by the electric charge 74. Similarly to what has been described for the output voltage Udc, the presence detection circuit of the connecting cable is adapted to provide to the second input of the regulator, a signal corresponding to a quiescent current when the connecting cable is not connected. In response to this signal corresponding to the quiescent current, the regulator acts upon the converter 4 in order to deliver at output the quiescent current. Conversely, when the connecting cable is connected to the power supply source, the regulator acts upon the converter 4 in order to deliver at output a current corresponding to the value of the second resistor. Advantageously, to save energy, the quiescent current corresponds to the minimum value of the current which can be delivered by the converter 4. Within the framework of the applications of this variation for recharging batteries such as mobile phone batteries, this variation is adapted so that, as long as the voltage of the battery to be recharged is smaller than the voltage set by the first resistor, the power supply source behaves solely like a current source whereof the intensity is set by the second resistor. When the battery voltage is equal to the voltage set by the first resistor, the power supply source behaves then exclusively like a voltage source whereof the value is set by the first resistor. For an embodiment example of this variation of the regulator, the reader may refer to the application notes of the integrated circuit 'TSM101' of 'ST Microelectronics' (Worldwide Headquarters, 165, rue Edouard Branly, B.P. 112—Technoparc du Pays de Gex, France—01637 Saint-Geny-Pouilly, France).

In another variation, the regulator 4 is exclusively capable of controlling the output intensity Idc of the converter 4. The power supply source 2 is then a current source. In this variation, the resistor 92 does not, therefore, set the voltage Udc to be delivered at output, but the intensity of the current Idc to be delivered at output. This variation finds, in particular, applications for recharging batteries such as mobile phone batteries.

In another alternative, the voltage converter is connected, not to an alternate power supply source, but to a direct power supply source.

In a simplified variation, the resistor 106 of the comparator 38 has been dispensed with, Similarly, in a simplified variation of the embodiment described at FIG. 3B, the resistor 136 has been dispensed with.

As a variation, the cable 180 of FIG. 5 includes several connecting terminals similar to the connecting terminal 96 in order to control simultaneously several resistor switching circuits of the detection circuit 46. In this variation, the selection code is formed by the combination of several resistors.

Although the detection circuit 46 described in the previous embodiments has solely been realised using analogue electric components, as a variation, the detection circuit 46 has been realised using digital electronic components, such as an analogue/digital converter or a digital potentiometer.

Finally, the power supply source 2 may also be housed in a multiple power outlet or a modular power outlet.

The invention claimed is:

1. An electric power supply source which is intended to be connected to an electric charge by means of a removable connecting cable, including:
    a controllable electric power conversion circuit which is used to convert an electric input signal into an electric output signal, at least one characteristic of said electric output signal being controllable;
    a control circuit for the controllable power conversion circuit which is used to control said at least one characteristic of the electric output signal according to a selection code that is representative of the requirements of the connected charge, characterized in that it includes a cable presence detection circuit capable of delivering a signal of absence of the connecting cable to the control circuit, and in that the control circuit is capable, in response to the signal of absence of the connecting cable, of controlling the power conversion circuit in order to obtain, at the output thereof, a same pre-determined quiescent value for said at least one characteristic of the output electric signal; said same pre-determined quiescent value being acceptable for all the electric charges liable to be connected to the power supply source.

2. The present power supply source according to claim 1, characterized in that the cable presence detection circuit is capable of delivering a signal of presence of the connecting cable to the control circuit, said presence signal of the connecting cable being related to the selection code representative of the requirements of the electric charge connected, and in that the control circuit is capable, in response to the signal of presence of the connecting cable, of controlling the power conversion circuit in order to obtain, at the output thereof, one value of said at least one characteristic of the output electric signal corresponding to the requirements of the electric charge connected.

3. The electric power supply source according to claim 1, characterized in that it includes:
 at least a first terminal for connection to the connecting cable to transmit to the electric charge the output electric signal delivered by the electric power conversion circuit,
 at least a second terminal for connection to the connecting cable intended for co-operating with a corresponding terminal of the connecting cable in order to indicate the absence or the presence of the connecting cable, said at least second connecting terminal being connected to the detection circuit.

4. The electric power supply source according to claim 3, characterized in that it comprises at least a third terminal for connection to the connecting cable to receive from the latter the selection code, said at least third terminal being connected to the detection circuit.

5. The electric power supply source according to claim 1, characterized in that the cable presence detection circuit includes an electric switch that may be toggled between a quiescent state and an active state wherein it indicates the presence of the connecting cable (122), this toggling taking place under the control of the connecting cable.

6. The electric power supply source according to claim 5, characterized in that the electric switch is a mechanical electricity switch which may be toggled between a quiescent position and an active position wherein it indicates the presence of the connecting cable, this displacement taking place under the action of the mechanical forces exerted to couple said at least second terminal to the corresponding terminal of the connecting cable.

7. The electric power supply source according to claim 1, characterized in that the controllable power conversion circuit is capable of delivering an output electric signal whereof said at least one controllable characteristic is controllable within a value range comprised of a minimum value and a maximum value, and in that the quiescent value is equal to the minimum value.

8. The electric power supply source according to claim 1, characterized in that one said characteristic of the controllable output electric signal is the amplitude of the voltage delivered by the power supply source.

9. The electric power supply source according to claim 1, characterized in that one characteristic of the controllable output electric signal is the intensity of the current delivered by the power supply source.

10. An electric power supply system for an electric charge, characterized in that it comprises:
 an electric power supply source according to claim 1, and
 a removable cable connecting the electric charge to the power supply source, said cable being adapted for co-operating with the cable presence detection circuit of the power supply source.

11. The system according to claim 10, characterized in that the connecting cable includes a removable device for adapting the cable to the power supply source.

12. The system according to claim 10, characterized in that the control circuit of the power supply source is capable of regulating said at least one characteristic of the output electric signal, and in that regulation loop of said at least one characteristic of the output signal is connected to the output of the controllable electric conversion circuit of the power supply source and to an input of the control circuit, a portion of the regulation loop being housed in the connecting cable when the latter is connected to the power supply source.

13. The system according to claim 10, characterized in that the control circuit of the power supply source is capable of regulating said at least one characteristic of the output electric signal, and in that a regulation loop of said at least one characteristic of the output signal is connected to the output of the controllable electric conversion circuit of the power supply source and to an input of the control circuit, the regulation loop being housed solely inside the power supply source.

14. The system according to claim 12, characterized in that the regulation loop comprises at least one resistor, the value of said at least one resistor forming a selection code.

15. The system according to claim 12, characterized in that at least one resistor is housed in the removable connecting cable.

16. The system according to claim 13, characterized in that the power supply source comprises several resistors capable of being connected to the regulation loop under the control of the connecting cable, the value of each of said resistors forming, individually or in combination with the other resistors, a selection code.

17. The system according to claim 14, characterized in that at least one resistor is housed in the removable connecting cable.

* * * * *